United States Patent
Yamanaka

(12) 
(10) Patent No.: US 6,268,925 B1
(45) Date of Patent: *Jul. 31, 2001

(54) PRINTING SYSTEM

(75) Inventor: Tsuyoshi Yamanaka, Komaki (JP)

(73) Assignee: Brother Kogyo Kabushiki Kaisha, Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/096,339

(22) Filed: Jun. 12, 1998

(30) Foreign Application Priority Data

Jun. 16, 1997 (JP) .................................. 9-158743

(51) Int. Cl.7 ............................................. G06F 15/00
(52) U.S. Cl. .......................................... 358/1.14; 358/1.13
(58) Field of Search ................................. 358/1.14, 1.13, 358/1.12, 1.9, 1.17, 1.6, 1.4, 1.15, 1.16

(56) References Cited

U.S. PATENT DOCUMENTS

| 5,528,346 | 6/1996 | Kim et al. | 355/204 |
| 5,752,049 | * 5/1998 | Lee | 395/750.05 |
| 5,803,623 | * 9/1998 | Iwasaki | 400/54 |
| 5,850,245 | * 12/1998 | Goto et al. | 347/156 |
| 5,940,366 | * 8/1999 | Moriue et al. | 370/216 |

FOREIGN PATENT DOCUMENTS 7-210039   8/1995   (JP) .............................. G03G/21/00

* cited by examiner

Primary Examiner—Joseph Mancuso
Assistant Examiner—Douglas Tran
(74) Attorney, Agent, or Firm—Oliff & Berridge, PLC

(57) ABSTRACT

When a printing operation is executed according to an application program, the environment set section 70 of the printer driver is called at a predetermined timing to obtain the information on an output port (S2) and, if the output port is ready (S3: YES) and the data transmission interval between the latest data transmit time set in the data transmit time control section 73 and the present time is more than a reference time (S4, S5: YES), the wake-up command transmission section 72 is caused to transmit an automatic wake-up command to the laser printer 40 during a sleep mode.

20 Claims, 5 Drawing Sheets

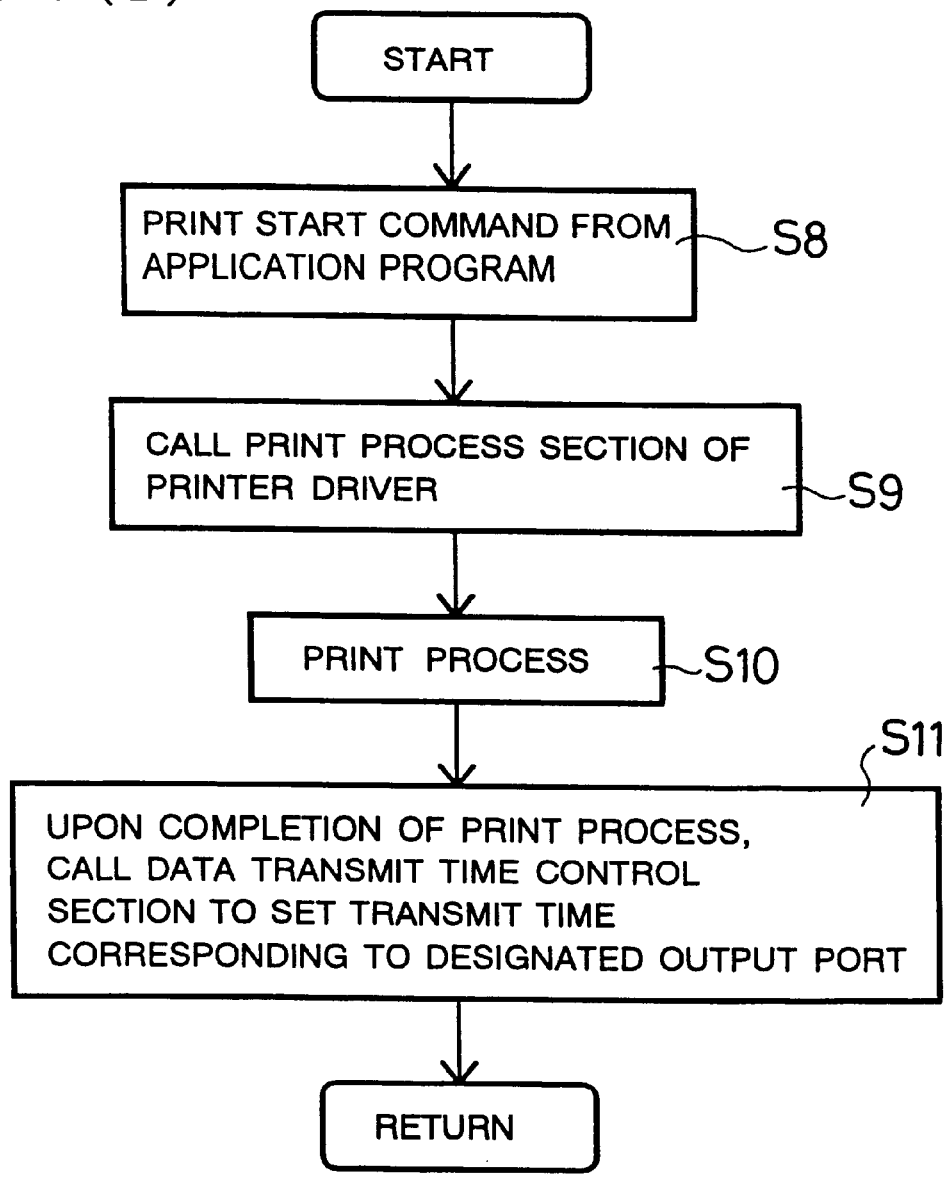

PRINTING SYSTEM

BACKGROUND OF THE INVENTION

1. Field of the Invention

The present invention relates to a printing system having a computer system for executing various application programs and a printer with a sleep mode, and more particularly to a printing system enabling an automatic wake-up operation of a printer to make a prompt printing operation by transmitting a wake-up command to the printer which is in the sleep mode when a printer driver is called through an operating system (OS) in preparation for a printing operation according to an application program.

2. Description of Related Art

Heretofore, for one of printers which print in accordance with the print data transmitted from a personal computer, there has been known a printer which enters a sleep mode by cutting off power supply to a part of a hard wear of the printer itself if it does not perform a printing operation for more than a preset time.

The sleep mode is an effective function for power saving in printers. Because it can prevent a toner fixing heater from being continuously heated while the printer does not perform printing for a long time, which would cause waste power consumption.

The printer with the sleep mode, generally, is arranged so that it is released from the sleep mode when the printer receives a signal representative of print data from, for example, a personal computer and then starts a warm-up process. If, however, the print data is transmitted from a personal computer to the printer during a sleep mode, the printer could start a printing operation after the elapse of a remarkably long time from the signal transmit time, so that it takes a long time to complete the printing operation.

To resolve the above problem, for instance, in Japanese Patent unexamined publication No. 7-210039, there is disclosed a power saving printing method of a printing system having a personal computer with an input device and an image forming device for performing a printing operation when the device receives a print code from the computer, wherein a power saving mode is established when the device does not carry out a print operation for a predetermined period of time. This method includes inputting a dummy print code from the computer to the image forming device when the specific input previously provided in the input device of the computer enters to the image forming device during the power saving mode, and performing a wake-up operation of the device when received the dummy print code to enter a standby mode.

According to the above power saving printing method, a wake-up operation can be performed by computer input prior to an actual printing operation, which makes it possible to reduce a time required to perform a wake-up operation of the device in the power saving mode in preparation for a printing operation.

However, this method needs the entry of the specific input through the input device of the computer in order to wake up, prior to a printing operation, the image forming apparatus during the power saving mode. Such entry of the specific input has to be executed by a user entering a specific code with a keyboard of the computer prior to a printing operation, but most of users often forget to enter the specific code in advance.

If a user had forgotten to enter the specific code in advance, the wake-up operation of the image forming device is performed at the time that a print code is input according to a print start command. In this case, a printing operation is executed after the long lapsed time from the time print data have been transmitted to the image forming device, resulting in a long printing time.

SUMMARY OF THE INVENTION

The present invention has been made in view of the above circumstances and has an object to overcome the above problems and to provide a printing system capable of automatically early performing a wake-up operation of a printer to enable a prompt printing operation by transmitting a wake-up command to the printer which is in the sleep mode when a printer driver is called in preparation for a printing operation according to an application program, without needing any specific operation such as the entry of a specific code.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, there is provided a printing system comprising a computer system which executes various application programs and a printer which enters a sleep mode when no print data is transmitted thereto from the computer system for more than a predetermined sleep time, the system further comprising means for detecting that a printer driver corresponding to the printer has been called at a time of a printing operation performed according to an application program, and means for transmitting a wake-up command to the printer being in a sleep mode when the call detecting means detects the call to the printer driver.

According to the printing system of the present invention, at the time that a printing operation is started according to an application program, the call detecting means detects that the printer driver corresponding to a printer concerned is called and the wake-up command transmission means outputs awake-up command to the printer during a sleep mode. Accordingly, the printer can automatically be woken up early prior to a printing operation, thus enabling a prompt printing process.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

DETAILED DESCRIPTION OF THE PREFERRED EMBODIMENTS

Figure 1:
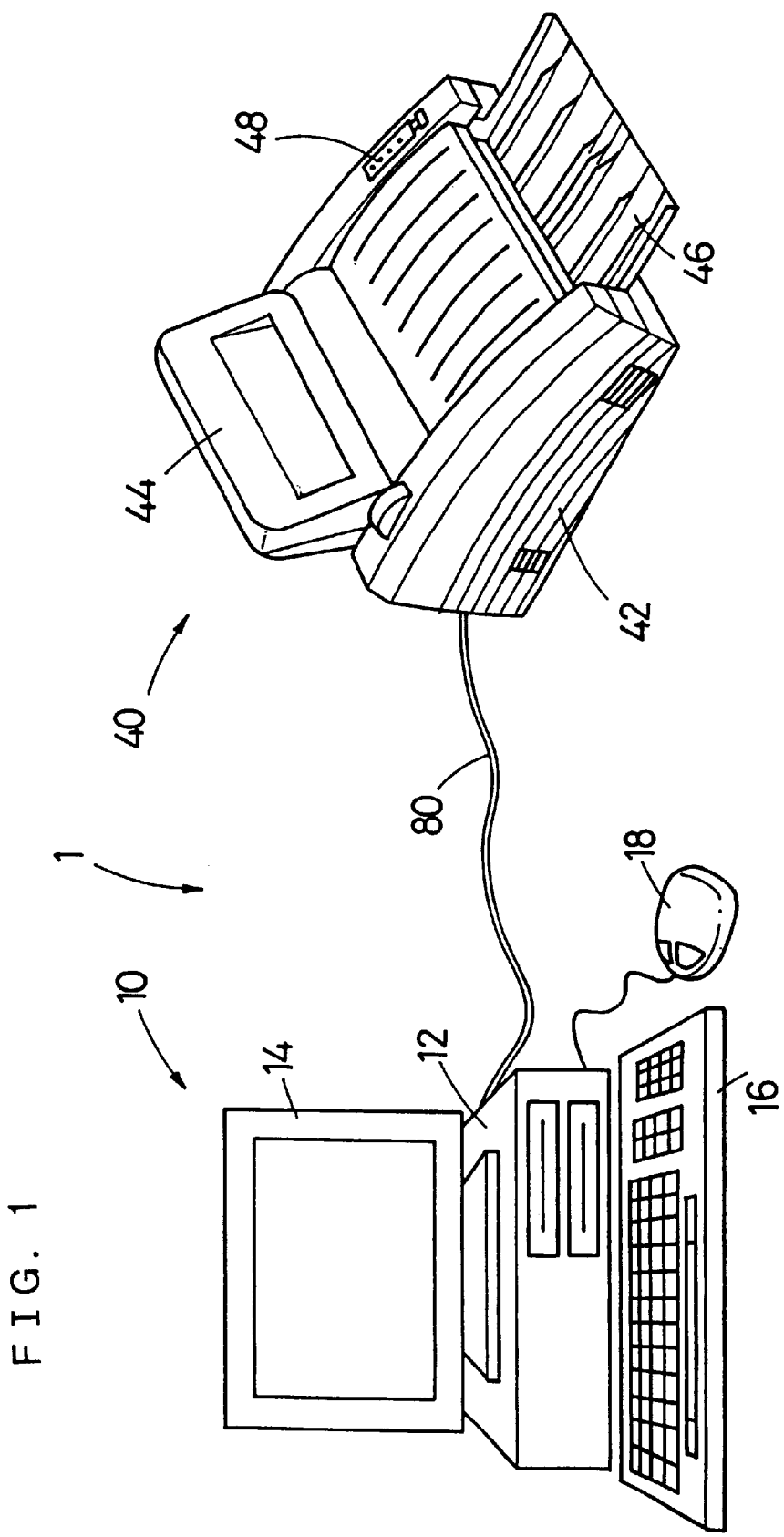
FIG. 1 is a perspective view of a printing system in an embodiment according to the present invention.

A detailed description of one preferred embodiment of a printing system embodying the present invention will now be given referring to the accompanying drawings. First, a schematic structure of the printing system in the embodiment will be described with reference to FIGS. 1 and 2. FIG. 1 is a perspective view of a printing system and FIG. 2 is a block diagram of a computer system and a laser printer in the printing system.

In FIG. 1, a printing system 1 has a computer system 10 and a laser printer 40 connected to the computer system 10 through a parallel cable 80. This computer system 10 is provided with a computer 12 as a central unit. The computer system 10 has also a display 14, a keyboard 16, and a mouse 18, all connected to the computer 12. The laser printer 40 is provided with a main body 42, a paper supply tray 44, a paper discharge tray 46, and others. A control panel 48 is provided on the upper plane of the main body 42.

Figure 2:
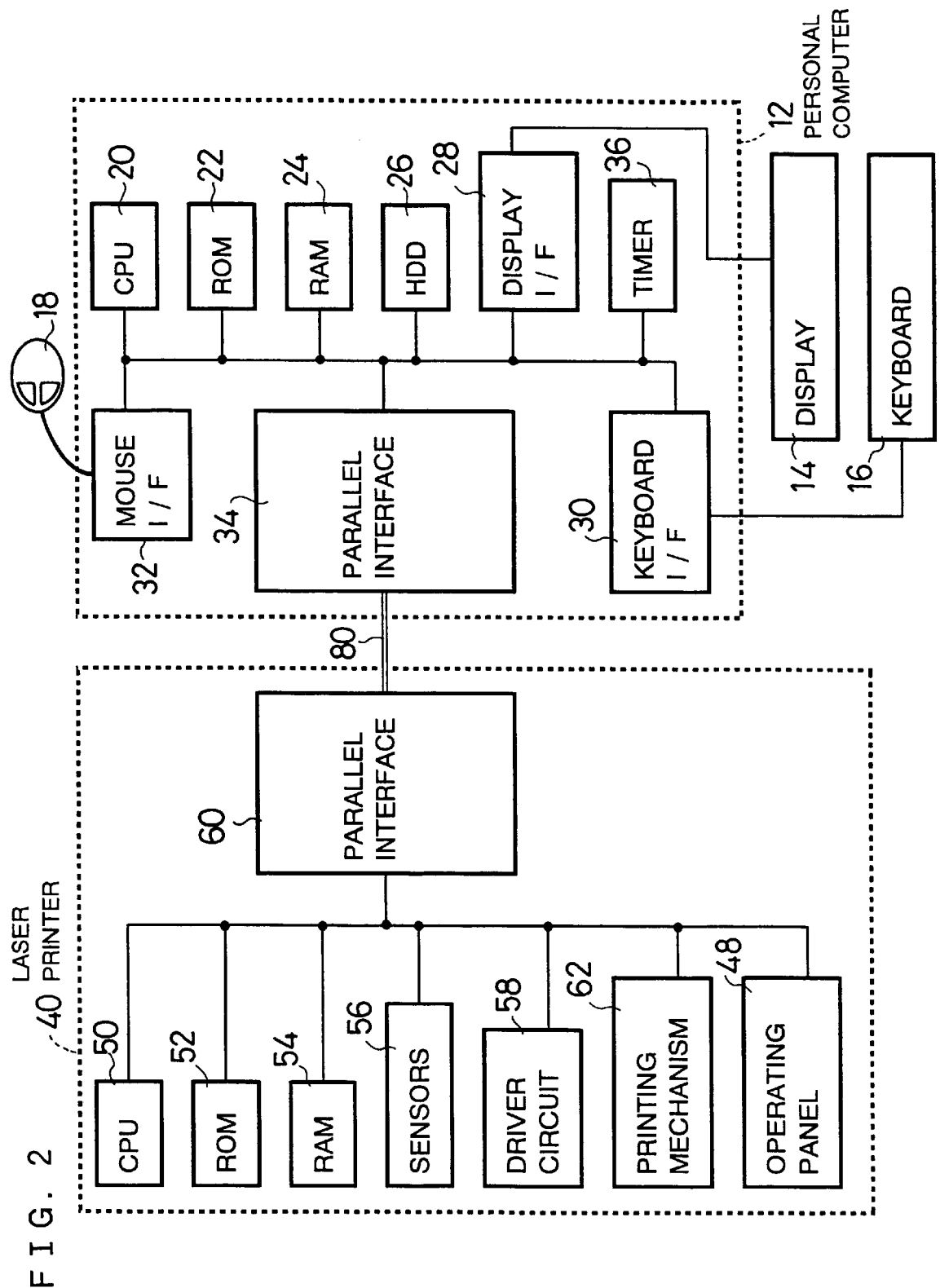
FIG. 2 is a block diagram of a computer system and a laser printer in the printing system.

In the computer 12, as shown in FIG. 2, CPU 20, ROM 22, RAM 24, a hard disc device (HDD) 26, a display interface (display I/F) 28, a keyboard interface (keyboard I/F) 30, a mouse interface (mouse I/F) 32, a parallel interface 34, and a timer 36 are connected with one another through a bus line. The keyboard 16 is connected to the keyboard I/F 30. The mouse 18 is connected to the mouse I/F 32. An end of the parallel cable 80 is connected to the parallel I/F 34. The display 14 is connected to the display interface 28.

The HDD 26 stores a predetermined operating system (OS) and other application programs which are executed individually on the operating system.

Figure 3:
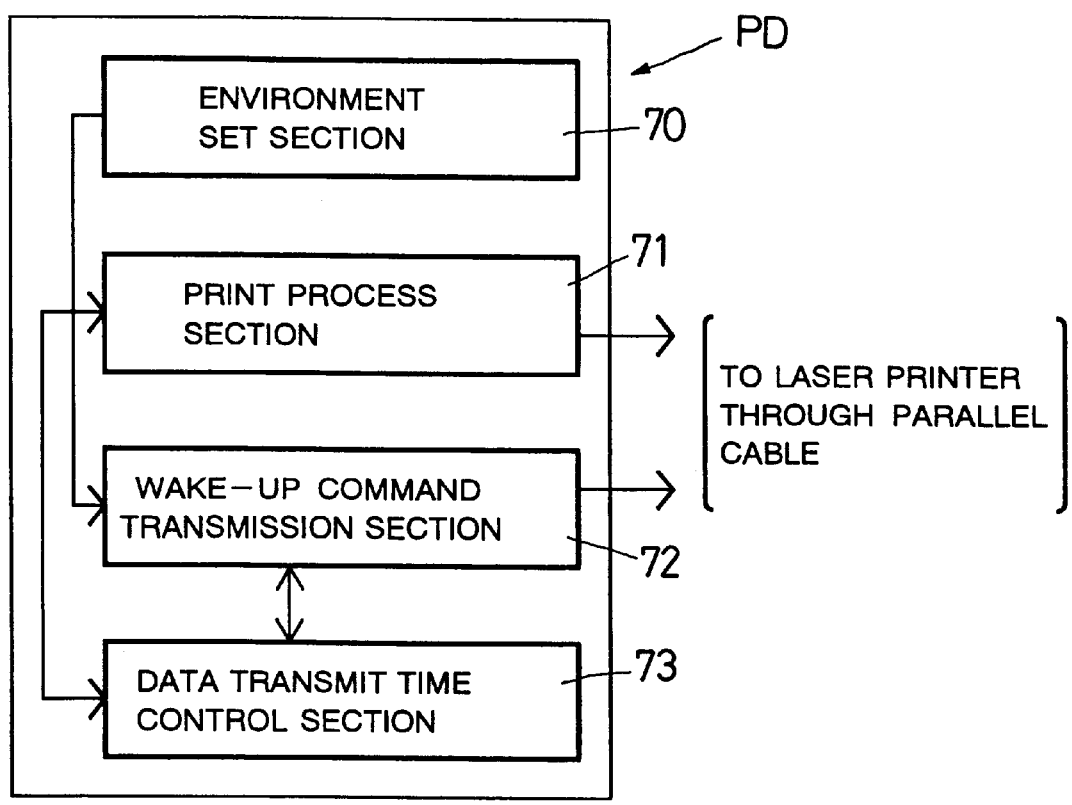
FIG. 3 is a schematic conceptual diagram of a printer driver.

Furthermore, the HDD 26 stores printer drivers corresponding to various types of printers, which will be loaded on RAM 24 at a predetermined timing under the control of the operating system. Instead of the RAM 24, a part of HDD 26 may be used as a virtual memory. The printer driver is explained below, referring to FIG. 3 which is a schematic conceptual diagram of the printer driver. In FIG. 3, a printer driver PD mainly includes an environment set section 70, a print process section 71, a wake-up command transmission section 72, and a data transmit time control section 73.

The environment set section 70 is a part where set is the information on an output port of the laser printer 40 to which printing data is to be outputted, more specifically, the information related to the output port, for example, a local printer port, a network port, and the like, designated by an user through the operating system. When this environment set section 70 is called through the application program under the control of the operating system, an automatic wake-up routine is executed as will be mentioned later.

The print process section 71 is a part which is called through the operating system at the start time of a print process, at the end time of the print process, and the end of page, and others when a print start command is generated from the application program thereby to start the printing process. The print process section 71 transmits print data to the laser printer 40 through the parallel cable 80.

The wake-up command transmission section 72 is a part which transmits an automatic wake-up data or command to the laser printer 40 through the parallel cable 80, according to the output port information in the environment set section 70. In this regard, the wake-up command transmission section 72 transmits the automatic wake-up command only when the difference between the latest transmit time stored every output port in the data transmit time control section 73 and the present time, namely, a data transmission interval is more than a predetermined time. The present time is counted by the timer 36.

For the wake-up command, a reset command which resets the laser printer 40 is preferably used. With this reset command, even if there remain the print data that have not been printed out yet before the laser printer 40 enters a sleep mode, the reset command can the remaining print data to be printed out. The laser printer 40 reset according to the reset command can be initialized at the same time in preparation for the next printing operation, thereby preventing malfunction.

The data transmit time control section 73 is for controlling the latest transmit time by storing the transmit time when a automatic wake-up command or print data is transmitted from the print process section 71, in combination with the information on the output port concerned.

Returning to FIG. 2, the laser printer 40 has CPU 50, ROM 52, RAM 54, sensors 56 such as a paper supply sensor and a toner sensor, a driver circuit 58, a parallel interface 60, a control panel 48, a printing mechanism 62, and others. All sections except for the printing mechanism 60, namely, the CPU 50 to the parallel interface 60 are connected to one another through a bus line. The printing mechanism 62 is connected to the driver circuit 58.

The printing mechanism 62 includes a well known photosensitive drum, a charger for charging the photosensitive drum, a laser irradiation mechanism for irradiating the photosensitive drum with a laser beam, a paper supply roller, a transfer roller, a developing roller, a cleaning roller, a motor for driving those rollers, and a heater for toner fixation. The printing mechanism 62 prints printing data on the paper supplied from the paper supply tray and discharge it after printing. The driver circuit 58 is to control the operation of each section in the printing mechanism 62 in accordance with the printing data temporality stored in the RAM 54 in accordance with an instruction from the CPU 50 to enable the printing mechanism 62 to execute a printing operation.

Receiving no print data from the computer system 10 for more than a predetermined period, the laser printer 40 enters a sleep mode under the control of the CPU 50.

Figure 4:
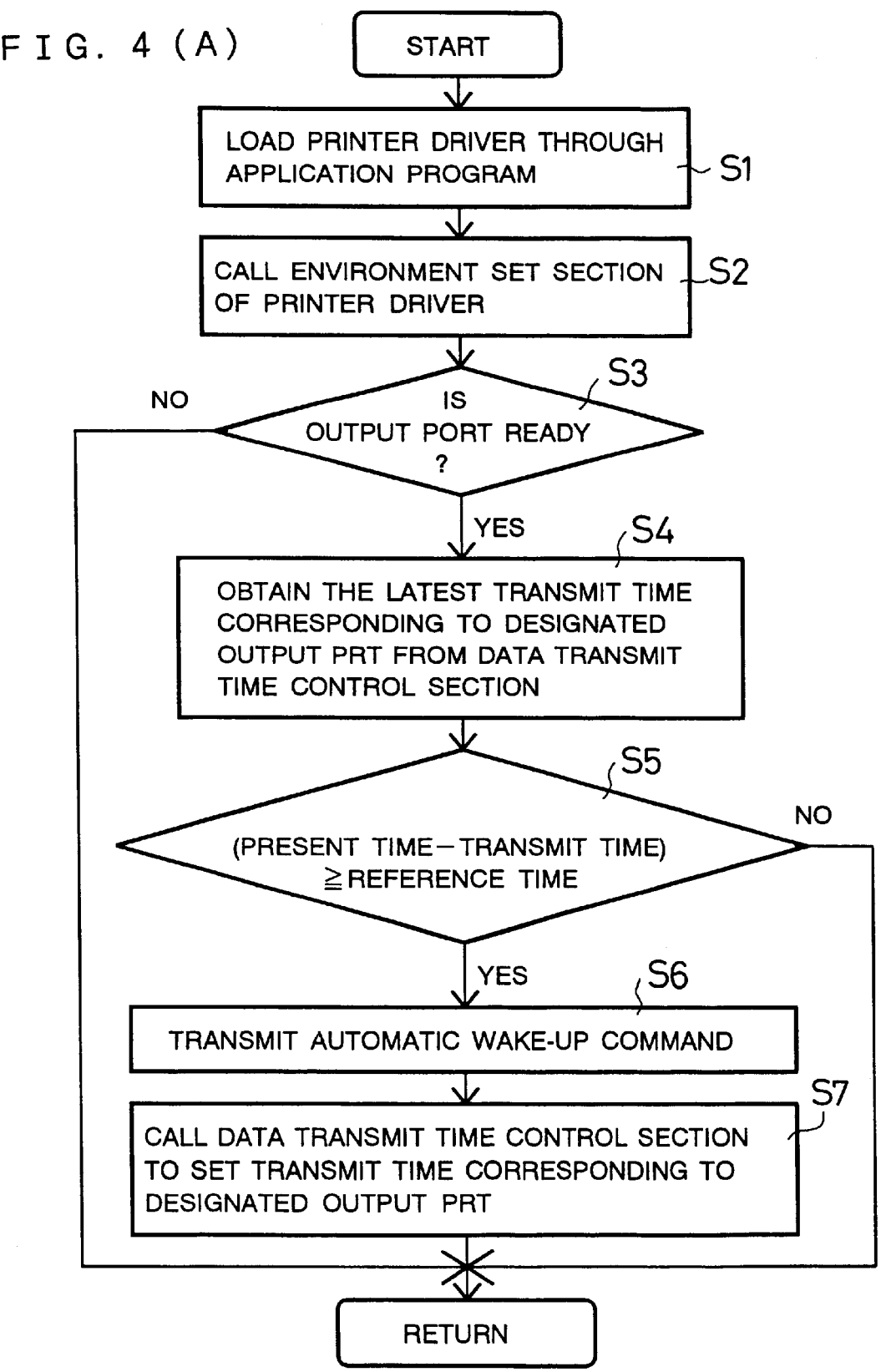
FIG. 4(A) is a flowchart of an automatic wake-up process routine of the printing system.
FIG. 4(B) is a flowchart of a printing process routine of the printing system.

Next, operation of the printing system constructed as above will be described with reference to FIGS. 4(A) and 4(B). FIG. 4(A) is a flowchart of an automatic wake-up process routine of the printing system 1, and FIG. 4(B) is a flowchart of a print process routine. Here, it is conditioned that the laser printer 40 has entered the sleep mode through the CPU 50 as mentioned above.

Explaining the automatic wake-up process with reference to FIG. 4(A), in step (referred to as S hereinafter) 1, when the application program is started up under the control of the operating system, a printer driver PD corresponding to the laser printer 40 is selected from the printer drivers stored in the HDD 26 and is loaded on the RAM 24. In 52, the environment set section 70 of the printer driver PD is called through the operating system. The environment set section 70 thus obtains the information on the output port. It is detected that the printer driver has been called.

Many cases are conceivable for the time the operating system calls the environment set section 70 of the printer driver PD. For example, as mentioned above, there is a case that the environment set section 70 is called at the start-up time of the application program.

In the other case, if the operating system is "Windows 95" and the like, the environment set section 70 is called when the print setting mode of the laser printer 40 is established on the application program, more specifically, when a dialog box for the print setting mode is displayed on a display 14. In the other case, similarly, when the printer driver PD is switched to a different one on a dialog box for the print setting mode displayed on a display 14, the environment set section 70 of the printer driver PD is called.

The above timing to call the environment set section 70 of the printer driver PD may be selected according to conditions of the printing system.

Subsequently, in S3, it is determined whether the designated output port corresponding to the output port information obtained in S2 is in a ready state. If it is not ready (S3: NO), the process is finished, while if it is ready (S3: YES), the process proceeds to S4. In this way, the designated port of the laser printer 40 is checked to be ready or not when the printer driver PD is called and, if it is not ready, the printer driver PD does not transmit an automatic wake-up command to the laser printer 40.

In S4, the data transmit time control section 73 is referred to obtain the latest transmit time stored in corresponding to the designated output port. In S5, thereafter, the difference between the present time (counted by the timer 36 and so on) and the latest transmit time obtained in S4, in other words, the data transmission interval, is calculated. It is determined whether the thus obtained data transmission interval is larger than a predetermined reference time. This reference time is preferably set to the same value as a sleep time that is the period from the completion of printing to the start of a sleep mode. For instance, the reference time is set to 1 min. for the sleep time of 1 min. The judgement is made because continuous transmission of the automatic wake-up command before a reference time passes from the latest transmission of the automatic wake-up command or the print data will cause the laser printer 40 that is not in the sleep mode to wake up, heating a heater in a fixing section of the laser printer 40, resulting in unnecessary consumption of energy. This is against power saving. The judgement is also done in order to avoid unnecessary data transmission process which may apply extra loads on the computer system.

When the data transmission interval is smaller than the reference time (S5: NO), the process is finished. When it is larger (S5: YES), on the other hand, the process advances to S6 where the wake-up command transmission section 72 corresponding to the designated port transmits an automatic wake-up command to the laser printer 40. The laser printer 40 is thus released from the sleep mode and performs a warm-up operation in each section of the printing mechanism 62 in preparation for a printing process which is to be executed thereafter.

In S7, the data transmit time control section 73 is called to set the transmit time corresponding to the designated output port. Thus, the process is finished.

Next, referring to FIG. 4(B), the printing process is explained. The printing process is started in accordance with a print start command generated from the application program (S8). In S9, the print process section 71 of the printer driver PD is called through the operating system. In response to the call, the print process section 71 transmits print data to the laser printer 40 through the parallel cable 80, causing the printing mechanism 62 and others to perform a print process After completion of the print process, in S11, the data transmit time control section 73 is called to set the print data transmit time corresponding to the designated output port to which the print data was transmitted. Accordingly, the transmit time stored in the data transmit time control section 73 is updated to the latest transmit time and stored.

According to an application program or an operating system, there is a case that, in response to the print start command generated in S8, the environment set section 70 is called before the print process section 71 is called. In this case, after the execution of the S2 and subsequent processes shown in FIG. 4(A), the S9 and subsequent processes are performed.

As mentioned above, in the printing system 1 in the present embodiment, when a printing operation is performed pursuant to t an application program, the environment set section 70 of the printer driver PD called at predetermined timing is given the information on the output port (S2). If the designated output port is ready (S3: YES) and the data transmission interval which is calculated by subtracting the present time from the latest data transmit time set in the data transmit time control section 73 is larger than a reference time (S4, S5: YES), an automatic wake-up command is transmitted to the laser printer 40 being in a sleep mode. Accordingly, without needing any conventional operation such as input of a specific code, the printing system can cause the laser printer 40 to automatically wake up prior to a printing operation, thus achieving a prompt printing process.

Furthermore, a determination is made as to whether the designated output port of the laser printer 40 is ready when the environment set section 70 is called (S3) and, if it is not ready (S3: NO), the wake-up command transmission section 72 does not transmit an automatic wake-up command to the laser printer 40, while transmits the command (S6) only it the designated output port is ready (S3: YES). The transmission of an automatic wake-up command is caused only when the laser printer is in a print ready state. This makes it possible to avoid unnecessary processes and increase the speed of a printing process.

The printing system is also arranged so that the data transmission section 72 transmits an automatic wake-up command to the laser printer 40 (S6) only when the data transmission interval obtained from the latest transmit time of an automatic wake-up command or print data, set in the data transmit time control section 73, is larger than a reference time (S5: YES). This can avoid unnecessary wake-up operation of the laser printer 40 to prevent waste power consumption thereof. It is also possible for both the computer system and the printer to prevent unnecessary data transmitting and receiving processes which deteriorates through-put (processing speed).

The present invention may be embodied in other specific forms without departing from the spirit or essential characteristics thereof. For instance, in the above embodiment, through an application program under the control of an operating system, the printer driver PD corresponding to the laser printer 40 is selected from the printer drivers stored in the HDD 26 and loaded on RAM 24 (SI) and then the environment set section 70 of the printer driver PD is called through the operating system. In the case that the printer driver PD has already been loaded on RAM 24, however, the environment set section 70 is directly called, instead of loading of the same printer driver PD on the RAM 24 again.

Although the above embodiment describes the automatic wake-up operation of a heater in a fixing section and the like of the laser printer 40 having a sleep mode, the present invention can also be applied to the wake-up operation of laser scanners and the like which can enter a sleep mode.

The present invention can be applied to, for instance, scanner devices (optical read-out devices) having a sleep mode. In this case, the same effect can be obtained if a device driver (scanner driver) conformable to the scanner device has a similar function to the printer driver mentioned above. It can also be applied to other device drivers.

Furthermore, in the above embodiment, the computer system 12 has originally stored in HDD 26 various application programs, printer driver, and other programs; however, those programs stored in memory medium such as a CD-ROM, a floppy disc, etc. may be loaded in the computer system that stores therein no application programs and others.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A printing system comprising a computer system which executes various application programs and a printer which enters a sleep mode when no print data is transmitted thereto from the computer system for more than a predetermined sleep time, the system further comprising:

means for starting an application program of the various application programs;

means for selecting a printer driver that corresponds to the printer;

means for calling the printer driver;

means for detecting that the printer driver has been called at a time of a preparatory operation of printing performed before a print start command is generated; and means for transmitting a wake-up command to the printer that had been in a sleep mode when the means for detecting detects that the printer driver has been called, such that the wake-up command is issued prior to the start command being generated.

2. A printing system according to claim 1, wherein said wake-up command transmission means is a part of the printer driver.

3. A printing system according to claim 2, wherein said wake-up command transmission means transmits the wake-up command to the printer concerned when the printer driver is called with information on an output port for print data.

4. A printing system according to claim 1, wherein the call detecting means detects that the printer driver has been called at a start-up time of the application program.

5. A printing system according to claim 1, wherein the call detecting means detects that the printer driver has been called at a time of setting a print set mode of the printer in the computer system.

6. A printing system according to claim 1, wherein the call detecting means detects that the printer driver has been called at a time of being switched to a different printer driver in the print setting mode.

7. A printing system according to claim 1, further comprising means for checking whether the printer is in a ready state when the printer driver is called; and wherein the wake-up command transmission means transmits the wake-up command to the printer if judged to be ready by the checking means.

8. A printing system according to claim 7, wherein the wake-up command transmission means inhibits transmission of the wake-up command to the printer when the printer is judged to be not ready by the checking means.

9. A printing system according to claim 1, further comprising;

means for detecting a transmission interval between a latest transmit time that the wake-up command is transmitted from the wake-up command transmission means and a present time; and means for comparing the transmission interval detected by the interval detecting means and a predetermined time;

wherein the wake-up command transmission means transmits the wake-up command when the transmission interval is detected to be more than the predetermined time by the comparing means.

10. A printing system according to claim 9, wherein the wake-up command transmission means inhibits transmission of the wake-up command when the transmission interval is detected to be less than the predetermined time by the comparing means.

11. A printing system according to claim 9, wherein the predetermined time is set to the same value as the sleep time.

12. A printing system according to claim 9, wherein the transmission interval detecting means detects a transmission interval between a transmit time of a latest transmission of the wake-up command or print data to the printer and a present time.

13. A printing system according to claim 12, wherein the wake-up command transmission means inhibits transmission of the wake-up command when the transmission interval is detected to be less than the predetermined time by the comparing means.

14. A printing system according to claim 12, wherein the predetermined time is set to the same value as the sleep time.

15. A printing system according to claim 1, wherein the call detecting means detects that the printer driver has been called after the printer driver corresponding to the printer is loaded on a memory.

16. A printing system comprising a computer system which executes various application programs and a printer which enters a sleep mode when no print data is transmitted thereto from the computer system for more than a predetermined sleep time, the system further comprising:

a starting device that starts an application program of the various application programs;

a selector that selects a printer driver that corresponds to the printer;

a calling device that calls the printer driver;

a call detector for detecting that the printer driver has been called at a time of a preparatory operation of printing performed before a print start command is generated; and a transmitter for transmitting a wake-up command to the printer that had been in a sleep mode when the call detector detects that the printer driver has been called, such that the wake-up command is issued prior to the start command being generated.

17. A printing system according to claim 16, wherein the call detector detects that the printer driver has been called at a time of setting a print set mode of the printer in the computer system.

18. A printing system according to claim 16, further comprising;

a transmission interval detector for detecting a transmission interval between a latest transmit time that the wake-up command is transmitted from the wake-up command transmission means and a present time; and a comparator for comparing the transmission interval detected by the interval detecting means and a predetermined time;

wherein the wake-up command transmitter transmits the wake-up command when the transmission interval is detected to be more than the predetermined time by the comparator.

19. A printing system according to claim 18, wherein the transmission interval detector detects a transmission interval between a transmit time of a latest transmission of the wake-up command or print data to the printer and a present time.

20. A printing system according to claim 16, wherein the call detector detects that the printer driver has been called after the printer driver corresponding to the printer is loaded on a memory.

\* \* \* \* \*